United States Patent
Criqui et al.

(10) Patent No.: US 8,046,893 B2
(45) Date of Patent: Nov. 1, 2011

(54) METHOD FOR ASSEMBLING A MOTOR VEHICLE AXLE OF THE TYPE PROVIDED WITH SUSPENSION ARMS AND A CROSS-MEMBER MOUNTED BETWEEN SAID ARMS, AND CORRESPONDING AXLE

(75) Inventors: Bernard Criqui, Suresnes (FR); Samuel Fays, Paris (FR); Jean Veneau, Ardenay sur Merize (FR)

(73) Assignee: Renault s.a.s, Boulogne-Billancourt (FR)

( * ) Notice: Subject to any disclaimer, the term of this patent is extended or adjusted under 35 U.S.C. 154(b) by 781 days.

(21) Appl. No.: 11/995,772

(22) PCT Filed: Jul. 7, 2006

(86) PCT No.: PCT/FR2006/050687
§ 371 (c)(1),
(2), (4) Date: Jul. 11, 2008

(87) PCT Pub. No.: WO2007/010156
PCT Pub. Date: Jan. 25, 2007

(65) Prior Publication Data
US 2008/0314509 A1    Dec. 25, 2008

(30) Foreign Application Priority Data
Jul. 15, 2005  (FR) ...................................... 05 07561

(51) Int. Cl.
*B23P 25/00*   (2006.01)
*B23P 17/00*   (2006.01)
*B29C 51/16*   (2006.01)

(52) U.S. Cl. ........................... 29/458; 29/419.2; 156/212
(58) Field of Classification Search ................. 29/419.2, 29/507, 508, 897.2, 897, 458; 156/212; 219/603; 72/56; 301/124.1, 127; 180/905
See application file for complete search history.

(56) References Cited

U.S. PATENT DOCUMENTS

| | | |
|---|---|---|
| 6,389,697 B1 | 5/2002 | Benoit et al. |
| 7,536,765 B2 * | 5/2009 | Deslande et al. ............ 29/419.2 |
| 2002/0005622 A1 | 1/2002 | Glaser et al. |

FOREIGN PATENT DOCUMENTS

| | | |
|---|---|---|
| DE | 34 47 036 | 7/1986 |
| DE | 199 29 057 | 12/2000 |
| DE | 199 28 537 | 1/2001 |
| EP | 0 774 369 | 5/1997 |
| EP | 0861744 | 9/1998 |
| EP | 1 036 680 | 9/2000 |
| FR | 2 822 104 | 9/2002 |
| FR | 2 840 854 | 6/2003 |
| GB | 2 330 104 | 4/1999 |
| WO | WO 02/081239 | 10/2002 |

* cited by examiner

*Primary Examiner* — John C Hong
(74) *Attorney, Agent, or Firm* — Oblon, Spivak, McClelland, Maier & Neustadt, L.L.P.

(57) ABSTRACT

A method for assembling a motor vehicle axle including suspension arms and a cross-member mounted between the arms. The method applys an adhesive element on at least one portion of the cross-member, mounts the portion inside a bore of one of the suspension arms to as to leave a clearance between the suspension arm and the adhesive element, and radially deforms one of the assembling elements of the cross-member and the suspension arm to obtain a contact between the adhesive element and the bore of the suspension arm.

11 Claims, 2 Drawing Sheets

METHOD FOR ASSEMBLING A MOTOR VEHICLE AXLE OF THE TYPE PROVIDED WITH SUSPENSION ARMS AND A CROSS-MEMBER MOUNTED BETWEEN SAID ARMS, AND CORRESPONDING AXLE

BACKGROUND

The present invention relates to a method for assembling a motor-vehicle axle of the type comprising suspension arms carrying wheel supports, and a cross member mounted between the said suspension arms.

A motor-vehicle axle is generally equipped with two oscillating suspension arms, each carrying a wheel at one of their ends and which are articulated at their other end to the vehicle body. Elastic shock-absorbing means braced on the suspension arms support the body.

In the case of a motor-vehicle rear suspension, an axle additionally comprises a transverse bar that can be elastically deformed in torsion, rigidly connected via its ends to the two rear suspension arms.

The assembly of this cross member with the suspension arms not only must be particularly strong in order to efficiently transmit the forces undergone by the rear wheels of the vehicle to the body, but also must be constructed precisely in order to maintain the deflection of the axle during its spring movement.

In general, such assembly is achieved by press-fitting the cross member inside bores of the suspension arms, then welding these two elements to one another. More details can be found in the documents FR A3 2840854, WO A1 02/081239, US A1 2002/0005622, DE A1 19928537 and EP A1 0774369.

Such assemblies have the disadvantage that they do not withstand high induced stresses, thus making it particularly difficult to obtain axles comprising a cross member and suspension arms made with different materials, particularly with a view to reducing the total weight of the motor vehicle.

From document EP A2 0861744 there is known a motor-vehicle axle comprising suspension arms and a torsionally deformable transverse member constructed in the form of sections of design appropriate for being assembled merely by nesting.

In addition to the fact that the suspension arms and the cross member cause particularly laborious manufacture because of their design, the axle may have relatively poor operating reliability under conditions of large vibrations.

From document U.S. Pat. No. 6,389,697 there is also known a method for assembly of sections, in which method a first section is mounted in braced manner against a radial stop surface of a second section, in which there is machined an annular groove, then the first section is deformed radially by electromagnetic pulses so that its end becomes lodged in the interior of the said groove, and the sections are welded to one another.

Such an assembly method comprising steps of forming and electromagnetic welding has the disadvantage of consuming considerable energy.

BRIEF SUMMARY

The object of the present invention is therefore to remedy these disadvantages.

To this end, the object of the invention is a method for assembling a motor-vehicle axle of the type provided with suspension arms carrying wheel supports and with a cross member mounted between the said suspension arms, comprising successive steps in the course of which an adhesive element is applied onto at least one portion of the cross member, the said portion is mounted inside a bore of one of the suspension arms so as to leave some clearance between the said suspension arm and the adhesive element, and one of the elements of the assembly composed of the cross member and the suspension arms is deformed radially to bring about contact between the adhesive element and the bore of the suspension arm.

With such an assembly method, it thus becomes possible to achieve fixation of a cross member on the suspension arms in particularly efficient manner. In fact, the radial deformation of one of the elements of the assembly composed of the cross member and the suspension arms makes it possible to create a band around the adhesive element in a manner that ensures good functioning reliability of the axle.

In addition, because the cross member is mounted beforehand with clearance in the interior of the bore of the suspension arm, the risk of damage to the adhesive element can be substantially reduced.

In other words, the provision of clearance between the adhesive element and the suspension arm combined with the radial loading of the said adhesive element makes it possible to obtain a particularly strong and economical axle.

Furthermore, the assembly method according to the invention makes it possible to use suspension arms and a cross member in the rough condition without specific machining and to obtain axles composed of different materials so as to reduce the total weight of the axle.

In a preferred embodiment of the method, one of the said elements is deformed by means of an electromagnetic pulse generator.

Advantageously, the cross member is deformed toward the suspension arm, and the suspension arm is held rigidly.

Preferably, the adhesive element is applied over a length substantially longer than the transverse dimension of the suspension arm.

The adhesive element can also be applied over a length substantially equal to two times the diameter of the bore of the suspension arm.

Preferably, the said steps are carried out at each end of the cross member.

In one embodiment of the method, the adhesive element comprises glue.

In general, another object of the invention is a method for assembling a first motor-vehicle part onto a second part, comprising successive steps in which an adhesive element is applied over at least a portion of the first part, the said portion is mounted in the interior of the second part so as to leave clearance between the said second part and the adhesive element, and one of the two parts is deformed radially to bring about contact between the adhesive element and the second part.

Finally, another object of the invention is a motor-vehicle axle of the type provided with suspension arms carrying wheel supports and with a cross member mounted between the said suspension arms, the axle additionally comprising at least one adhesive element mounted on an end portion of the cross member in contact with a bore of one of the suspension elements. The said portion can be deformed radially, especially by electromagnetic pulses.

Advantageously, the bore of the suspension arm has multiple stages, thus making it possible to increase the reliability of assembly of the axle, for example in the case of possible failure of the adhesive element.

Advantageously, the cross member is made of a magnetic metal, especially steel, aluminum or titanium. The suspension arms can be made of aluminum.

BRIEF DESCRIPTION OF THE DRAWINGS

The invention and its advantages will be better understood by examining the description of an embodiment, which is in no way limitative and which is illustrated in the attached drawings, wherein.

DETAILED DESCRIPTION

Figure 1:
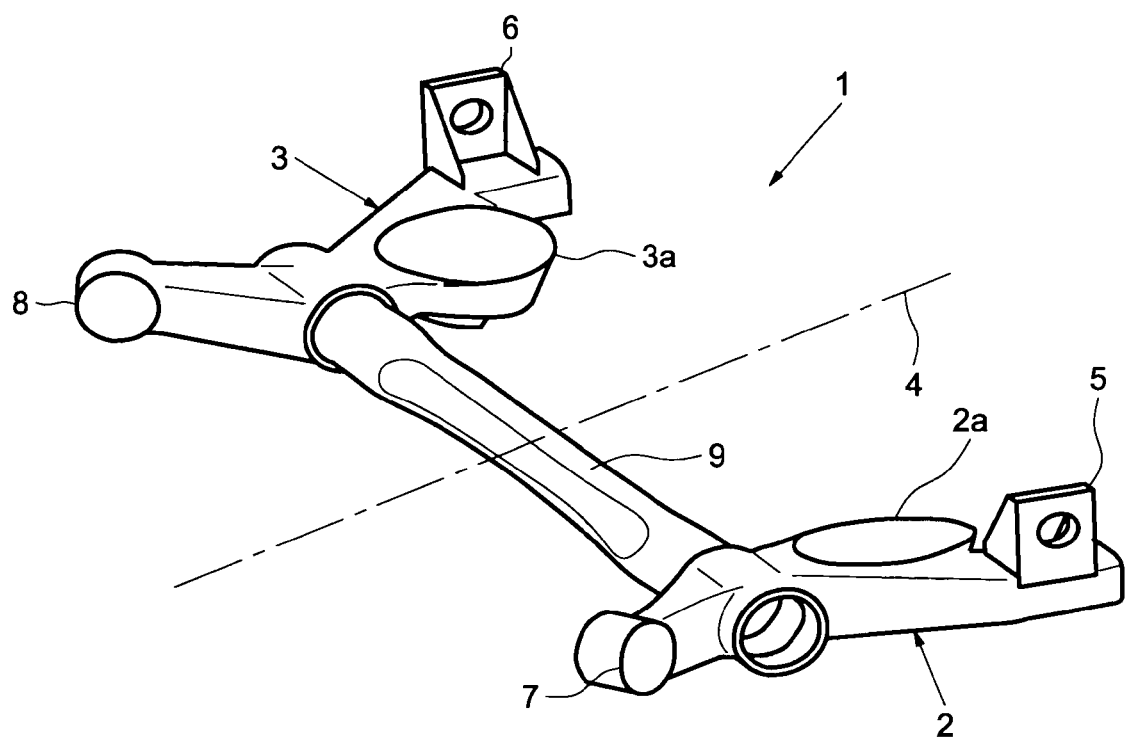
FIG. 1 is a perspective schematic view of an axle according to the invention.

FIG. 1 represents an axle obtained by the assembly method according to the invention and denoted by general numerical reference 1.

Axle 1 comprises two suspension arms 2, 3 extending substantially along median longitudinal axis 4 of the vehicle. Each suspension arm 2, 3 is connected respectively via an end 5, 6 directed toward the rear of the vehicle to a wheel support (not illustrated).

The term "rear" is understood here to mean the position in which axle 1 is disposed when it is mounted on a motor vehicle. The other end 7, 8 of suspension arms 2 and 3 is directed toward the front of the vehicle and articulated to the body of the vehicle.

In the vicinity of end 5, 6, each suspension arm 2, 3 comprises a flat support portion 2a, 3a mounted on the interior side of the axle and intended to receive an elastic means (not illustrated) such as a spring capable of supporting the vehicle body.

Each suspension arm 2, 3 is made here as a single piece, for example of cast aluminum. Such an arrangement makes it possible to eliminate the operations of mounting of support portions 2a, 3a and of ends 5 and 6 on the said arms.

A tubular cross member 9 is joined by end portions to the two suspension arms 2, 3. Cross member 9 may have different types of profiles as viewed in cross section. Cross member 9 is elastically deformable in torsion and is advantageously made of amagnetic metal, such as austenitic steel, high-strength aluminum or even titanium.

Figure 2:
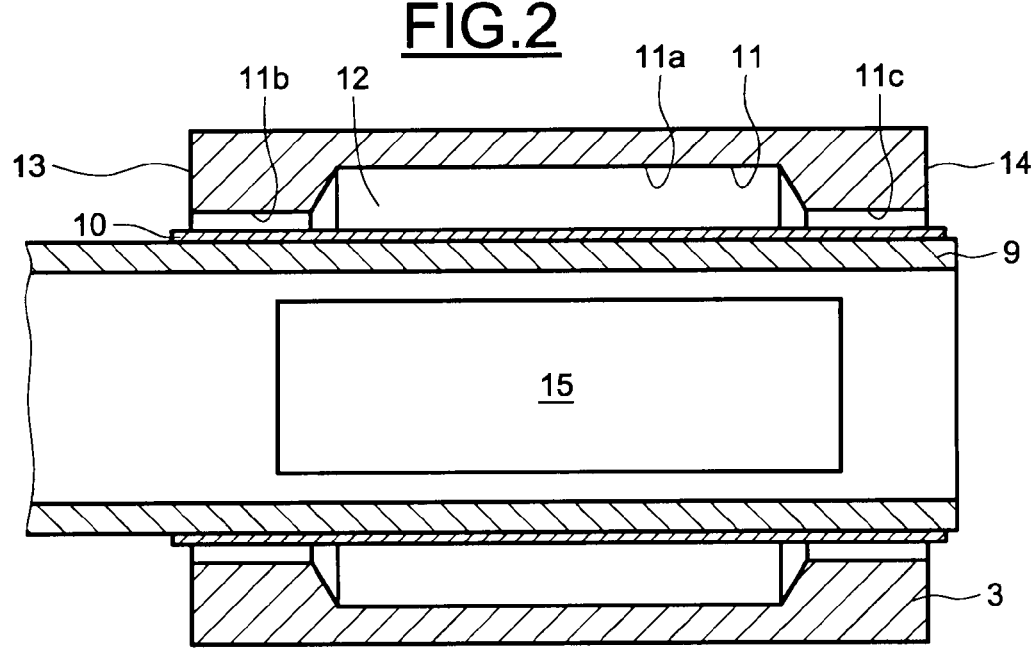
FIGS. 2 and 3 are sectional schematic views illustrating the main steps of assembly of the axle of FIG. 1.
Figure 3:
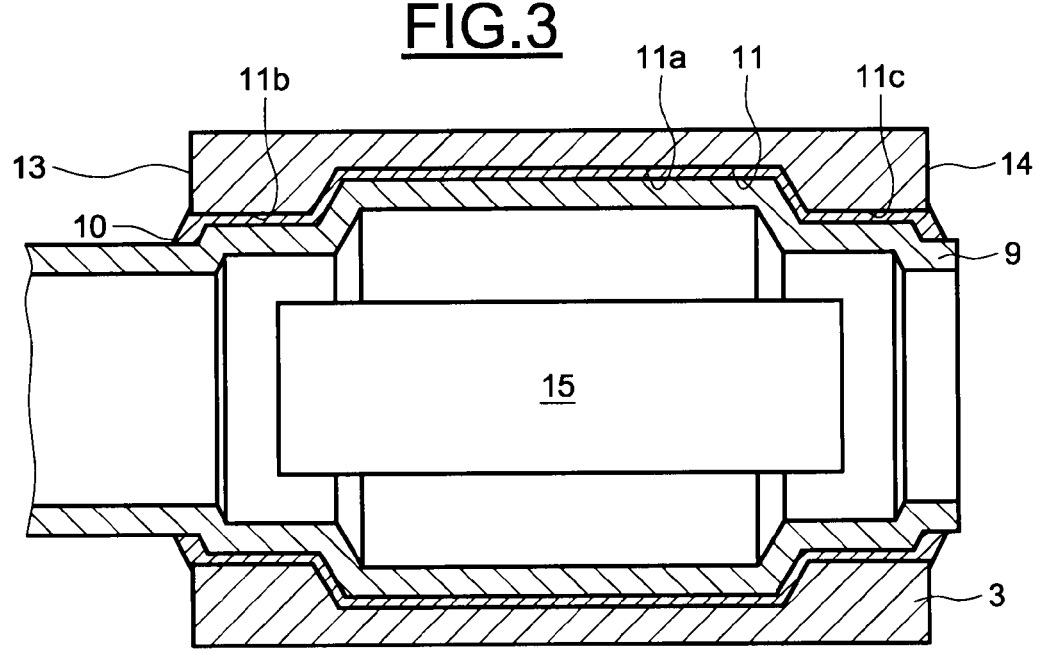

Referring now to FIGS. 2 and 3, the main steps of the assembly method used to join suspension arms 2, 3 rigidly to cross member 9 will now be described.

In a first step, an adhesive element 10 is applied onto an end portion of cross member 9 over a length substantially longer than the transverse dimension of suspension arm 3. Adhesive element 10 is therefore in contact with the outside cylindrical surface of cross member 9. As an example, adhesive element 10 can be synthetic glue.

Cross member 9 is then mounted in the interior of a multi-stage bore 11 of suspension arm 3, so as to leave, relative to the axis of cross member 9 (not illustrated), a radial clearance 12 between the said bore 11 and adhesive element 10. Beforehand, suspension arms 2 and 3 were fixed rigidly on a support (not illustrated) provided for this purpose.

Bore 11 has a first stage 11a extending over the major part of its length and second and third stages 11b, 11c that axially prolong first stage 11a at both ends. Second and third stages 11b, 11c have reduced diameter relative to that of first stage 11a. As an example, clearance 12 can be on the order of one mm between second and third stages 11b, 11c and adhesive element 10 and of five mm between first stage 11a and the said adhesive element.

Cross member 9 here is mounted in the interior of bore 11, so that adhesive element 10 projects axially relative to opposite frontal radial surfaces 13, 14 of suspension arm 3.

An electromagnetic pulse generator 15 is then introduced into the interior of cross member 9. Generator 15 can be a coil, for example. Generator 15 here is situated substantially in the region of first stage 11a of bore 11.

Generator 15 is then energized so as to create an electromagnetic field capable of allowing radial deformation, toward suspension arm 3, of the end portion of cross member 9 on which adhesive element 10 is mounted.

By way of indication, generator 15 is supplied with a power of 50 kJ for a duration of approximately 10 s, in order to deform a cross member 9 having a diameter of 80 mm and a thickness of 2 mm for an insertion length, in the interior of suspension arm 3, on the order to two times the diameter of the said cross member 9. Of course, it is also conceivable to deform cross member 9 mechanically.

After the forming operation, cross member 9 has a multi-stage end portion that substantially conforms with bore 11 of suspension arm 3. Adhesive element 10 is therefore compressed radially between the said cross member 9 and suspension arm 3, thus ensuring uniform distribution of the said adhesive element, especially when it comprises glue.

The contact of adhesive element 10 with cross member 9 and suspension arm 3, in combination with the radial deformation of the said cross member 9, therefore makes it possible to assure that it is axially blocked in the interior of bore 11 in particularly effective manner.

It also is conceivable to provide fluting in bore 11 to increase the reliability of tangential blocking of cross member 9 in the interior of bore 11.

FIGS. 2 and 3 illustrate only oscillating arm 3 of the axle, but it is easily understood that the previously described steps are reproduced identically in order to achieve fixation of cross member 9 relative to suspension arm 2.

The method of assembling a motor-vehicle axle according to the invention therefore makes it possible to fix a cross member rigidly to suspension arms that can be made of different materials, especially to integrate the suspension functions at the level of the said arms while reducing the total weight of the axle, and doing so in particularly simple and economical manner.

Of course, it is also conceivable to use this method to achieve assembly of other motor vehicle parts, for example to achieve fixation of sections intended to form the body structure of the vehicle, for example by mounting, in the interior of a first section, a second section on which an adhesive element has been applied beforehand, with clearance left between the first section and the adhesive element, then by deforming one of the two sections to achieve contact between the adhesive element and the first section.

The invention claimed is:

1. A method for assembling a motor-vehicle axle including suspension arms carrying wheel supports, and with a cross member mounted between the suspension arms, the method comprising:

mounting a portion of the cross member inside a bore of one of the suspension arms so as to leave clearance between the suspension arm and the cross member, the bore including successive stages such that a first stage has a first inner diameter, a second stage has a second inner diameter, and a third stage has a third inner diameter, the second stage being disposed between the first stage and the third stage, and the second inner diameter is larger than the first inner diameter and the third inner diameter; and deforming radially one element of an assembly composed of the cross member and the suspension arms to obtain contact between an adhesive element applied onto the portion of the cross member and the bore of the suspension arm, wherein the adhesive element is applied onto the cross member before being mounted inside the bore of the suspension arm.

2. A method according to claim 1, wherein the one element is deformed by an electromagnetic pulse generator.

3. A method according to claim 1, wherein the cross member is deformed toward the suspension arm, and the suspension arm is held rigidly.

4. A method according to claim 1, wherein the adhesive element is applied over a length substantially greater than a transverse dimension of the suspension arm.

5. A method according to claim 1, wherein the mounting and deforming radially operations are carried out at each end of the cross member.

6. A method according to claim 1, wherein the adhesive element comprises glue.

7. A method according to claim 1, wherein the first stage and the third stage are disposed at outer edges of the suspension arm.

8. A method according to claim 1, wherein the clearance between the first stage and the cross member is 1 mm, the clearance between the second stage and the cross member is 5 mm, and the clearance between the third stage and the cross member is 1 mm.

9. A method for assembling a first motor vehicle part onto a second part, comprising:
mounting a portion of the first part in an interior of the second part so as to leave clearance between the second part and the first part, the interior of the second part including successive stages such that a first stage has a first inner diameter, a second stage has a second inner diameter, and a third stage has a third inner diameter, the second stage being disposed between the first stage and the third stage, and the second inner diameter is larger than the first inner diameter and the third inner diameter; and
deforming radially one of the two parts to bring about contact between an adhesive element applied onto the first part and the second part, wherein the adhesive element is applied onto the first part before being mounted in the interior of the second part.

10. A method according to claim 9, wherein the first stage and the third stage are disposed at outer edges of the suspension arm.

11. A method according to claim 9, wherein the clearance between the first stage and the cross member is 1 mm, the clearance between the second stage and the cross member is 5 mm, and the clearance between the third stage and the cross member is 1 mm.

* * * * *